(12) United States Patent
Tonchia (10) Patent No.: US 9,061,331 B2
(45) Date of Patent: Jun. 23, 2015

(54) ANTI-ATTACHMENT DEVICE AND METHOD

(75) Inventor: Hélène Tonchia, Antony (FR)

(73) Assignee: CGGVERITAS SERVICES SA, Massy Cedex (FR)

( * ) Notice: Subject to any disclaimer, the term of this patent is extended or adjusted under 35 U.S.C. 154(b) by 552 days.

(21) Appl. No.: 13/454,590

(22) Filed: Apr. 24, 2012

(65) Prior Publication Data

US 2012/0275275 A1 Nov. 1, 2012

Related U.S. Application Data

(60) Provisional application No. 61/480,457, filed on Apr. 29, 2011.

(51) Int. Cl.
| | |
|---|---|
| *G01V 1/38* | (2006.01) |
| *B08B 17/02* | (2006.01) |
| *B08B 1/04* | (2006.01) |
| *G01V 1/20* | (2006.01) |
| *G01V 13/00* | (2006.01) |

(52) U.S. Cl.
CPC ......... *B08B 17/02* (2013.01); *Y10T 428/24744* (2015.01); *Y10T 29/49826* (2015.01); *B08B 1/04* (2013.01); *G01V 1/201* (2013.01); *G01V 1/38* (2013.01); *G01V 13/00* (2013.01)

(58) Field of Classification Search
CPC ........................................................ G01V 1/38
USPC ...................... 367/15, 191; 114/312
See application file for complete search history.

(56) References Cited

U.S. PATENT DOCUMENTS

| | | | |
|---|---|---|---|
| 7,145,833 B1* | 12/2006 | Hoogeveen | 367/15 |
| 7,409,919 B2* | 8/2008 | Hoogeveen et al. | 114/312 |
| 7,754,018 B2 | 7/2010 | Lepage et al. | |
| 8,695,524 B2* | 4/2014 | Tilley | 114/312 |
| 2006/0054186 A1* | 3/2006 | Lepage et al. | 134/6 |
| 2007/0201307 A1* | 8/2007 | Lobe et al. | 367/20 |
| 2008/0127875 A1* | 6/2008 | Hoogeveen et al. | 114/312 |
| 2012/0067368 A1* | 3/2012 | Toftner et al. | 134/6 |
| 2013/0170322 A1* | 7/2013 | Hartshorne et al. | 367/154 |

OTHER PUBLICATIONS

Australian Patent Examination Report issued Aug. 2, 2013, in related Australian Patent Application No. 2012202404.

* cited by examiner

*Primary Examiner* — Mark Hellner
(74) *Attorney, Agent, or Firm* — Patent Portfolio Builders PLLC (57) ABSTRACT

Method and an anti-attachment device configured to be provided on a streamer. The anti-attachment device includes a body configured to be provided around the streamer and a first end is configured to be rotatably attached to the streamer.

20 Claims, 9 Drawing Sheets

ANTI-ATTACHMENT DEVICE AND METHOD

CROSS-REFERENCE TO RELATED APPLICATIONS

This is a Non-provisional application which claims priority under 35 U.S.C. §119(e) to U.S. Provisional Application No. 61/480,457 filed on Apr. 29, 2011, the entire contents of which are hereby incorporated by reference into the present application.

BACKGROUND

1. Technical Field

Embodiments of the subject matter disclosed herein generally relate to methods and systems and, more particularly, to mechanisms and techniques for preventing various marine animals from attaching to seismic equipment.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill in order to avoid a dry well.

Marine seismic data acquisition and processing generate a profile (image) of the geophysical structure (subsurface) under the seafloor. This profile is used by those trained in the field, to evaluate the presence or absence of oil and/or gas traps. Thus, providing a high resolution image of the subsurface is an ongoing process for the exploration of natural resources, including, among others, oil and/or gas.

Figure 1:
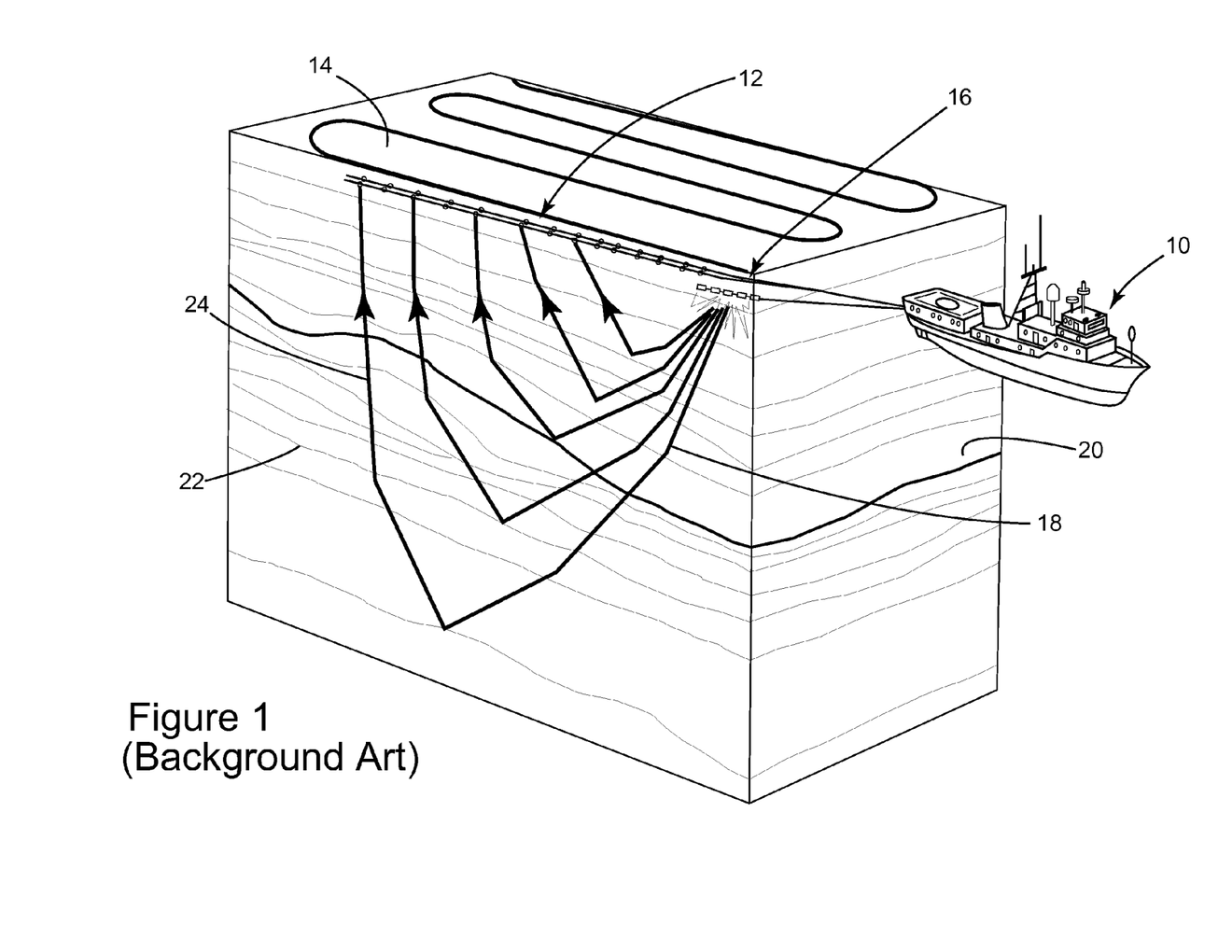
FIG. 1 is a schematic diagram of a conventional seismic data acquisition configuration.

During a seismic gathering process, as shown in FIG. 1, a vessel 10 drags an array of seismic detectors provided on streamers 12. The streamers may be disposed horizontally, i.e., lying at a constant depth relative to a surface 14 of the ocean. The vessel 10 also drags a sound source assembly 16 that is configured to generate an acoustic wave 18. The acoustic wave 18 propagates downwards toward the seafloor 20 and penetrates the seafloor until eventually a reflecting structure 22 (reflector) reflects the acoustic wave. The reflected acoustic wave 24 propagates upwardly until is detected by a detector on streamer 12.

The above noted arrangement is towed under water for days if not weeks for a given survey. Thus, it was noted that various marine animals, e.g., barnacles, attach to various components of the streamer, e.g., electronic components. The barnacles may change a desired weight of the streamer, may make the streamer deviate from its desired towed position or simply may make it difficult to manipulate the streamer for maintenance or when deployed under water.

Traditional methods employ a cleaning device that is configured to move along the streamer and clean the streamer from the marine animals. However, there are problems with these devices as they are bulky and they need to travel along various elements (e.g., birds, electronic boxes, etc.) connected to the streamer. Accordingly, it would be desirable to provide systems and methods that avoid the afore-described problems and drawbacks.

SUMMARY

According to one exemplary embodiment, there is a streamer having plural sections connected to each other. The streamer includes an anti-attachment device provided around one of the plural sections and configured to rotate relative to the one of the plural sections but not to move along the one of the plural sections.

According to another exemplary embodiment, there is an anti-attachment device configured to be provided on a streamer. The anti-attachment device includes a body configured to be provided around the streamer; and a first end configured to be rotatably attached to the streamer.

According to still another exemplary embodiment, there is a method for agitating water around a streamer. The method includes a step of providing an anti-attachment device along the streamer; and a step of rotationally fixing the anti-attachment device on the streamer so that the anti-attachment device rotates but does not moves along the streamer when towed underwater.

BRIEF DESCRIPTION OF THE DRAWINGS

The accompanying drawings, which are incorporated in and constitute a part of the specification, illustrate one or more embodiments and, together with the description, explain these embodiments. It is noted that no dimensions should be inferred from the drawings unless specifically indicated in the specification. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer having an electronic module. However, the embodiments to be discussed next are not limited to these structures, but may be applied to other structures that are exposed to a marine environment.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a section of a streamer that is covered by a anti-attachment device that is configured to rotate in order to prevent the barnacles or other marine animals to attach to the streamer. In one configuration, the anti-attachment device is configured to rotate around the streamer but not travel along the streamer. The anti-attachment device can cover a limited portion of the streamer or an entire section of the streamer. The anti-attachment device may only form turbulences in the water, next to the streamer, in order to prevent the marine animals to attach to the streamer. However, the anti-attachment device may be provided with various devices for scrubbing the streamer, or distributing a chemical around the streamer, or other purposes.

Figure 2:
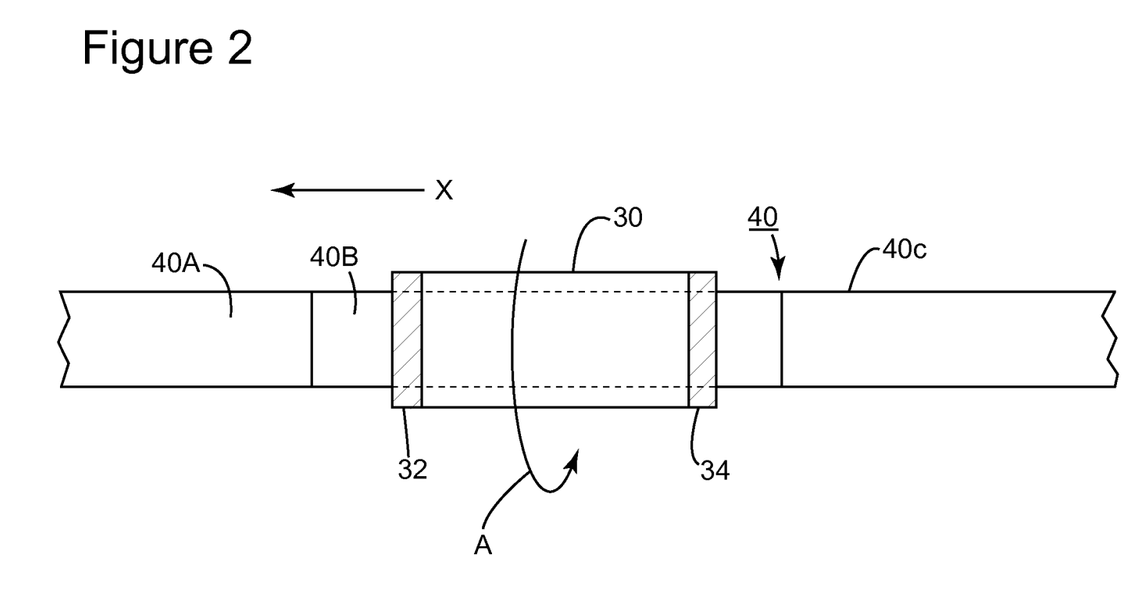
FIG. 2 is schematic diagram of an anti-attachment device according to an exemplary embodiment.

According to an exemplary embodiment shown in FIG. 2, an anti-attachment device 30 is shown provided over a streamer 40. The anti-attachment device is configured to rotate along an axis A but not to move along axis X. Assuming that the streamer is towed along the axis X, a first end 32 of the anti-attachment device 30 is rotatably fixed to the streamer 40 so that the anti-attachment device 30 is prevented from moving along axis X. In another exemplary embodiment, both ends 32 and 34 may be rotatably fixed to the streamer 40. The streamer 40 may include plural sections 40A-C. Various devices (e.g., a bird) may be provided between the streamers.

Figure 3:
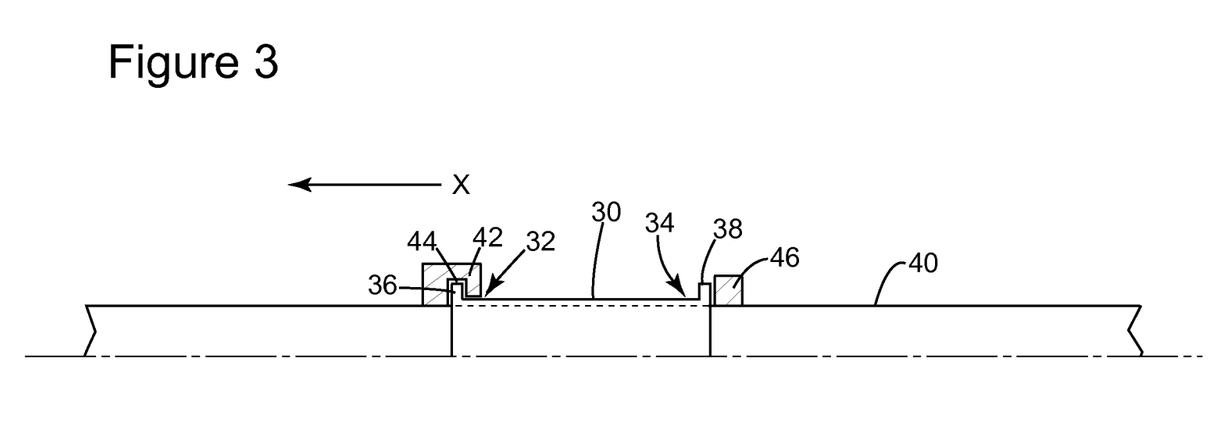
FIG. 3 is a schematic diagram of another anti-attachment device according to an exemplary embodiment.

According to an exemplary embodiment illustrated in FIG. 3, the end 32 of the anti-attachment device 30 may be rotatably fixed to the streamer 40 by a ring 42. The ring 42 is fixedly attached to the streamer 40 but is provided with a groove 44 in which a flange 36 of the anti-attachment device 30 is configure to fit. In this way, the flange 36 is allowed to rotate relative to the streamer 40 but not allowed to move along axis X. The other end 34 of the anti-attachment device 30 may be free, may have the same structure or the structure shown in FIG. 3. According to FIG. 3, another ring 46 may be fixedly attached to the streamer 40 to rotatably support end 34 but prevent is X movement. According to another embodiment, the anti-attachment device 30 may have another flange 38 configured to slide over a side of the ring 46. One skilled in the art would understand that these elements may be modified to still achieve the same effects, i.e., rotation and no translation. Regarding the term translation, it is understood that in fact the anti-attachment device 30 can slightly translate along the X axis but not freely, e.g., between rings 42 and 46. Other stopper structures may also be imagined.

Figure 4:
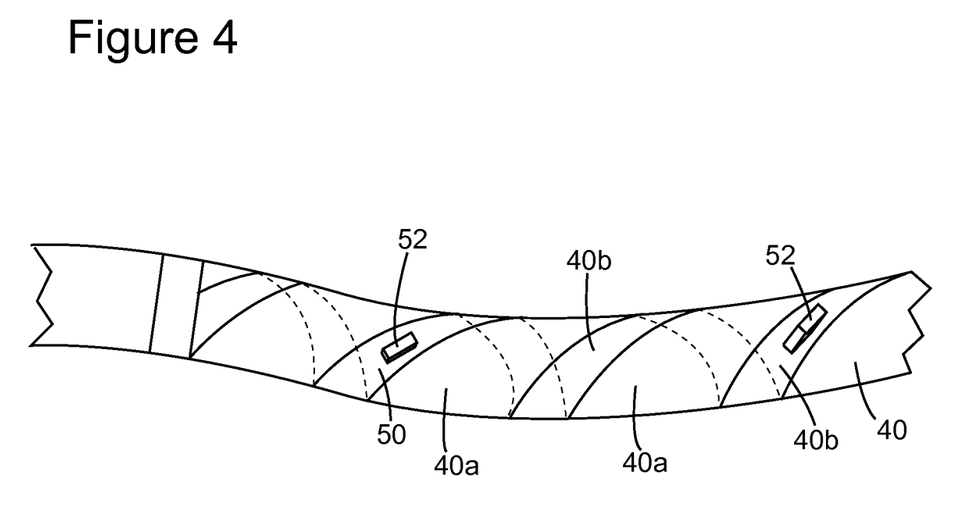
FIG. 4 is a schematic diagram of an anti-attachment device having a spiral shape according to an exemplary embodiment.

In an exemplary embodiment illustrated in FIG. 4, the anti-attachment device is a spiral 50 that is provided around the streamer 40 so that parts 40a of the streamer 40 are not covered by the spiral while parts 40b of the spiral are covered. By providing vanes or deflectors or wings 52 on one or more portions of the spiral 50, the spiral 50 rotates when towed under water, which will determine the portions 40a and 40b to continuously change so that all or most parts of the streamer are alternately covered and uncovered by the spiral. Thus, the effect of producing a water flow or water disturbances around the streamer is achieved.

Figure 5:
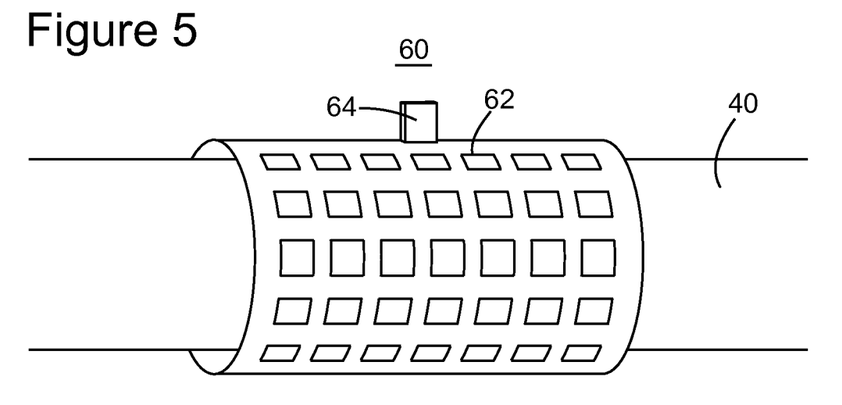
FIGS. 5 and 6 are schematic diagrams of anti-attachment devices having different shapes according to exemplary embodiments.
Figure 6:
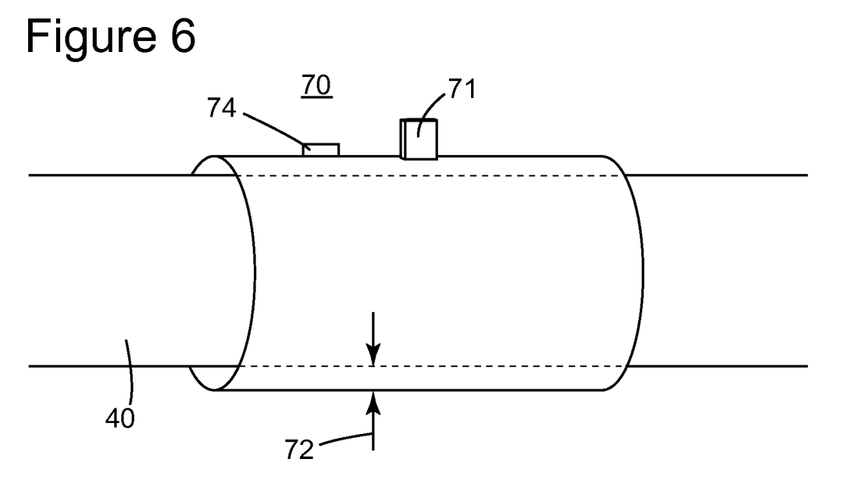

The anti-attachment device 30 may have other shapes that achieve the above noted effect. For example, as shown in FIG. 5, an anti-attachment device 60 may have a cylindrical shape with various holes 62 formed in it. One or more wings 64 may be attached. The wings may be inflatable. The holes 62 may have a pattern or not, may be more or less, may be big or more, etc. Another shape is shown in FIG. 6 in which an anti-attachment device 70 has no holes but only wings 71. The number of wings may vary as a function of the length of the anti-attachment device, towing speed, etc. Other rotating shapes may be imagined.

The anti-attachment device may be formed from a plastic material that is light and resistant. Alternatively, the anti-attachment device may be formed from a metal that does not corrode easily, from a composite material, etc. Alternatively, the anti-attachment device may be provided with a coating layer 74 (e.g., an anti-fouling coating) to prevent marine animals to attach to the anti-attachment device. In another application, instead of coating the device with the anti-fouling material, a part or all of the anti-attachment device may be formed of a material having anti-fouling properties, e.g., copper. The anti-attachment device may be rigid or allow for a limited deformation as long as the deformation does not impede the rotation of the anti-attachment device. A clearance 72 between an interior diameter of the anti-attachment device and an exterior diameter of the streamer 40 may be in the order of millimeters to centimeters or tens of centimeters.

Figure 7:
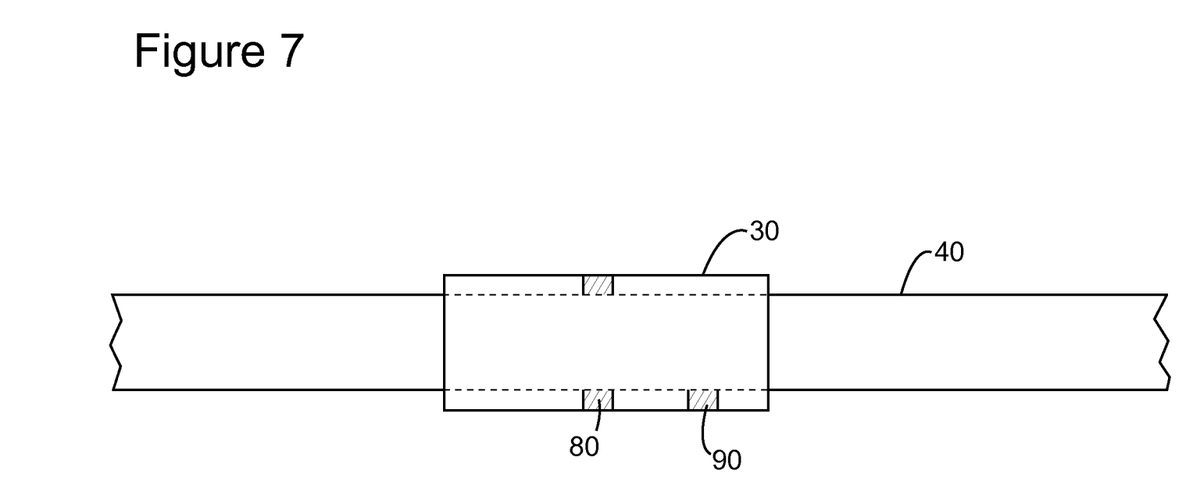
FIG. 7 is a schematic diagram of an anti-attachment device having various tools according to an exemplary embodiment.

The anti-attachment device may be provided with various tools. For example, as shown in FIG. 7, the anti-attachment device 30 may be provided with a tool 80, attached to the inside of the anti-attachment device and configured to touch the streamer 40. The tool 80 may scrape the exterior of the streamer 40 or may dispense a chemical on the surface of the streamer 40. The tool 80 is shown to be provided around the streamer 40. However, a tool 90, similar or different from tool 80, may be provided to not enclose the streamer 40.

In one exemplary embodiment, the anti-attachment device is provided with an anti-fouling coating to prevent the marine animals to attach to the anti-attachment device. In one application, an anti-sticking coating is provided inside the anti-attachment device to improve the rotation of the anti-attachment device relative to the streamer. In still another application, both ends of the anti-attachment device are rotatably fixed to the streamer. In yet another application, a brush is provided on the inside of the anti-attachment device. In another application the wings or vanes of the anti-attachment device are foldable for easy stowing and deploying while in another application the wings are inflated by the water when towed.

Figure 8:
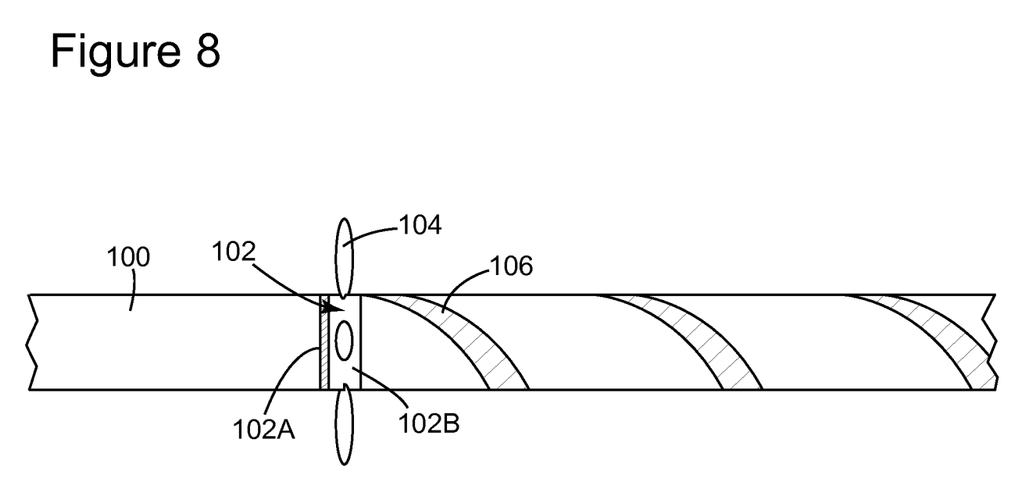
FIG. 8 is a schematic diagram of an anti-attachment device having an actuating device according to an exemplary embodiment.

According to another exemplary embodiment illustrated in FIG. 8, a streamer 100 is provided with an actuating device 102 configured to rotate relative to the streamer. The actuating device 102 may include a ring that has a fixed part 102A attached to the streamer and a rotatable part 102B configured to rotate relative to the fixed part 102A. The actuating device 102 may include wings 104 attached to the rotatable part 102B so that when the streamer is towed underwater, the wings 104 determine the rotatable part 102B to rotate. The anti-attachment device 106 may also be attached to the rotatable part 102B so that the anti-attachment device is actuated by the actuating device 102.

Figure 9:
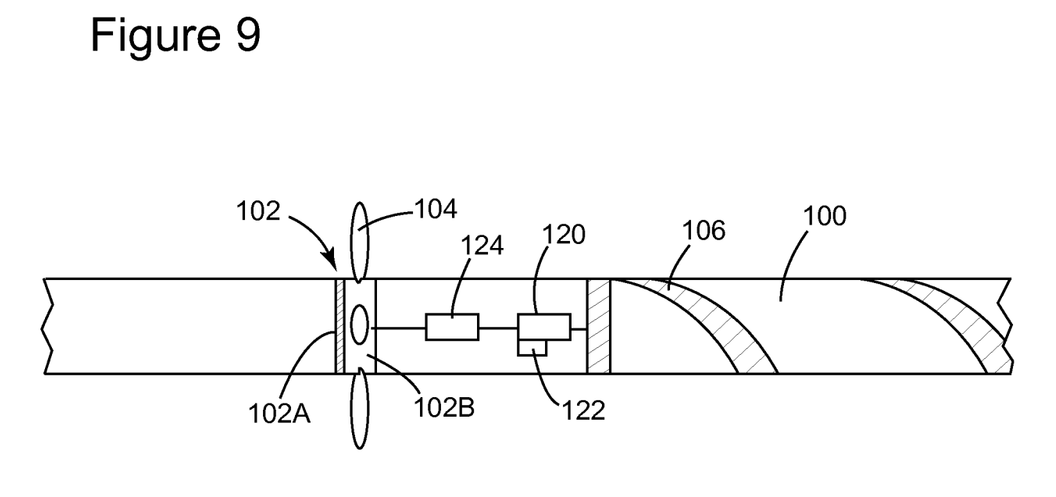
FIG. 9 is a schematic diagram of an anti-attachment device having a motor according to an exemplary embodiment.

In another embodiment illustrated in FIG. 9, the anti-attachment device 106 is coupled to a motor 120 that is configured to rotate. The motor 120 may include a controller 122 that is configured to rotate the motor 120 with a desired speed and at desired time intervals. The speed and time intervals may be transmitted from the vessel to the controller along the streamer, or wirelessly from a global control device (not shown). The motor 120 is coupled to a battery 124 for receiving its electrical energy. The battery maybe recharged by the actuating device 102 discussed with regard to FIG. 8.

Figure 10:
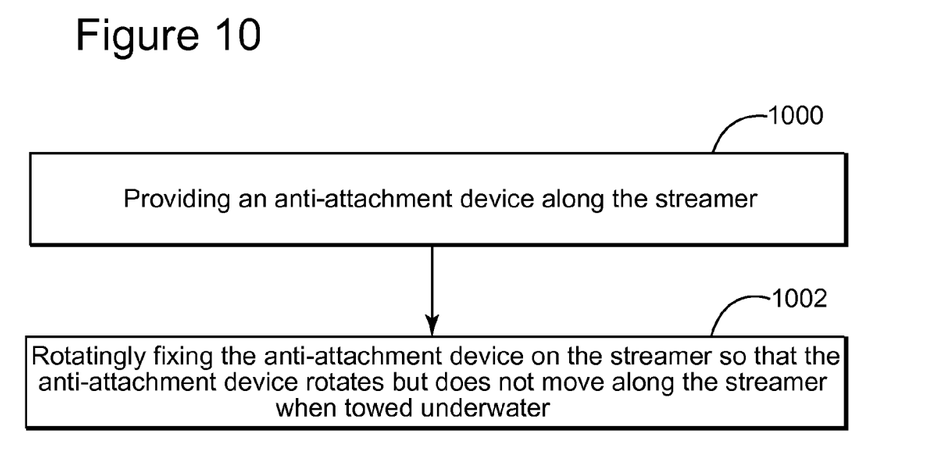
FIG. 10 is a flowchart illustrating a method for rotating an anti-attachment device according to an exemplary embodiment.

According to an exemplary embodiment illustrated in FIG. 10, there is a method for agitating water around a streamer. The method includes a step 1000 of providing an anti-attachment device along the streamer; and a step 1002 of rotationally fixing the anti-attachment device on the streamer so that the anti-attachment device rotates but does not moves along the streamer when towed underwater.

In addition, there is a method for providing a spiral type anti-attachment device around a streamer when deployed underwater for seismic exploration. The method includes a step of storing the streamer on a spool on a vessel; a step of deploying the streamer from the spool into the water while the vessel is moving; and a step of adding the spiral type anti-attachment device on the streamer as the streamer is unspooled from the spool. The spiral type anti-attachment device is added to the streamer after being unspooled but before being released into the water.

The disclosed exemplary embodiments provide a system and a method for providing a net over a section of a streamer. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A streamer comprising:
   plural sections connected to each other; and
   an anti-attachment device provided around one of the plural sections and configured to rotate relative to the one of the plural sections but not to move along the one of the plural sections,
   wherein the anti-attachment device has a first end configured to be rotatably fixed to the one of the plural sections so that a translation motion of the first end along the one of the plural sections is prevented.

2. The streamer of claim 1, further comprising:
   a first fixing device fixedly attached to the one of the plural sections; and
   the first end of the anti-attachment device is configured to be rotatably fixed to the first fixing device.

3. The streamer of claim 2, further comprising:
   a second fixing device fixedly attached to the one of the plural sections; and
   the anti-attachment device has a second end configured to be supported by the second fixing device and freely rotate.

4. The streamer of claim 1, wherein the anti-attachment device has a spiral shape.

5. The streamer of claim 1, wherein the anti-attachment device has a cylindrical shape.

6. The streamer of claim 5, wherein the anti-attachment device has one or more holes.

7. The streamer of claim 1, wherein the anti-attachment device is made of plastic.

8. The streamer of claim 1, further comprising:
   an actuating device connected to the anti-attachment device and configured to rotate the anti-attachment device.

9. The streamer of claim 8, wherein the actuating device has a first part fixed to the streamer and a second part configured to rotate relative to the streamer, and the anti-attachment device is connected to the second part.

10. The streamer of claim 9, further comprising:
    wings attached to the second part and configured to rotate when the streamer is towed underwater.

11. The streamer of claim 1, further comprising:
    a motor attached to the anti-attachment device and configured to rotate the anti-attachment device; and
    a battery connected to the motor and configured to supply electric energy.

12. The streamer of claim 11, further comprising:
    an actuation device connected to the battery and configured to recharge the battery.

13. An anti-attachment device configured to be provided on a streamer, the anti-attachment device comprising:
    a body configured to be provided around the streamer; and
    a first end configured to be rotatably attached to the streamer,
    wherein the first end is fixed to the streamer so that a translation motion of the first end along the streamer is prevented.

14. The anti-attachment device of claim 13, further comprising:
    an anti-fouling coating to prevent marine animals to attach to the anti-attachment device.

15. The anti-attachment device of claim 13, wherein at least a part is made of an anti-fouling material to prevent marine animals to attach to the anti-attachment device.

16. The anti-attachment device of claim 13, further comprising:
    an anti-sticking coating provided inside the anti-attachment device to improve a rotation of the anti-attachment device relative to the streamer.

17. The anti-attachment device of claim 13, further comprising:
    a brush provided on the inside of the anti-attachment device.

18. The anti-attachment device of claim 13, further comprising:
    one or more wings attached to an outside or inside of the anti-attachment device to promote the rotation movement.

19. A method for agitating water around a streamer, the method comprising:
    providing an anti-attachment device along the streamer; and
    rotationally fixing the anti-attachment device on the streamer so that the anti-attachment device rotates but does not moves along the streamer when towed underwater,
    wherein the anti-attachment device has a first end configured to be rotatably fixed to the streamer so that a translation motion of the first end along the streamer is prevented.

20. A method for providing a spiral anti-attachment device around a streamer when deployed underwater for seismic exploration, the method comprising:
    storing the streamer on a spool on a vessel;

deploying the streamer from the spool into the water while the vessel is moving; and adding the spiral anti-attachment device on the streamer as the streamer is unspooled from the spool, wherein the anti-attachment device has a first end configured to be rotatably fixed to the streamer so that a translation motion of the first end along the streamer is prevented.

\* \* \* \* \*

UNITED STATES PATENT AND TRADEMARK OFFICE
CERTIFICATE OF CORRECTION

PATENT NO. : 9,061,331 B2  Page 1 of 1
APPLICATION NO. : 13/454590
DATED : June 23, 2015
INVENTOR(S) : Tonchia It is certified that error appears in the above-identified patent and that said Letters Patent is hereby corrected as shown below:

Specification

In Column 4, Line 46, delete "1028" and insert -- 102B --, therefor.

In Column 4, Line 48, delete "1028" and insert -- 102B --, therefor.

In Column 4, Line 52, delete "1028" and insert -- 102B --, therefor.

Signed and Sealed this
Twenty-eighth Day of June, 2016

Michelle K. Lee
*Director of the United States Patent and Trademark Office*